United States Patent [19]
Anderson et al.

[11] Patent Number: 5,790,878
[45] Date of Patent: Aug. 4, 1998

[54] SYSTEM AND METHOD FOR RECOVERING FROM A POWER FAILURE WITHIN A DIGITAL CAMERA DEVICE

[75] Inventors: Eric C. Anderson; Celeste Johnson, both of San Jose, Calif.

[73] Assignee: Apple Computer, Inc., Cupertino, Calif.

[21] Appl. No.: 702,146

[22] Filed: Aug. 23, 1996

[51] Int. Cl.[6] .............................. G06F 11/00; H04N 5/30
[52] U.S. Cl. ..................... 395/750.08; 395/750.01; 395/181; 395/182.12; 348/372; 348/552
[58] Field of Search .................. 395/750.01, 750.07, 395/750.08, 181, 182.12; 348/231, 372, 552

[56] References Cited

U.S. PATENT DOCUMENTS

| | | | |
|---|---|---|---|
| 5,359,728 | 10/1994 | Rusnack et al. | 395/575 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,560,022 | 9/1996 | Dunstan et al. | 395/750.01 |
| 5,634,000 | 5/1997 | Wicht | 395/182.08 |

OTHER PUBLICATIONS

Martyn Williams, Review–NEC PC–DC401 Digital Still Camera, AppleLink Newbytes, Mar. 15, 1996, pp. 1–3.

*Primary Examiner*—Ayaz R. Sheikh
*Assistant Examiner*—Jeffrey K. Seto
*Attorney, Agent, or Firm*—Carr & Ferrell LLP; Gregory J. Koerner

[57] ABSTRACT

A system and method for recovering from a power failure in a digital camera comprises a power manager for detecting power failures, an interrupt handler for responsively incrementing a counter device, service routines which register to receive notification of the power failure, and a processor for evaluating the counter and providing notification of the power failure to the service routines which then assist the digital camera to recover from the power failure.

18 Claims, 9 Drawing Sheets

SYSTEM AND METHOD FOR RECOVERING FROM A POWER FAILURE WITHIN A DIGITAL CAMERA DEVICE

CROSS-REFERENCE TO RELATED APPLICATIONS

This application relates to co-pending U.S. patent application Ser. No. 08/595,493, entitled "Apparatus And Method For Handling Interrupts In A Computer System," filed on Feb. 1, 1996, and to co-pending U.S. patent application Ser. No. 08/633,105, entitled "A System And Method For Managing Utilization Of A Battery," filed on Apr. 16, 1996, and to copending U.S. patent application Ser. No. 08/666241, entitled "System And Method For Using A Unified Memory Architecture To Implement A Digital Camera Device," filed on Jun. 20, 1996, which are hereby incorporated by reference.

BACKGROUND OF THE INVENTION

1. Field of the Invention

This invention relates generally to digital cameras and more particularly to a system and method for recovering from a power failure within a digital camera device.

2. Description of the Background Art

Modern photographic technology presently features a variety of digital camera devices which capture image data by electronically scanning selected target objects. Digital camera devices typically process and compress the captured image data before storing the processed image data into internal or external memory devices. Furthermore, these digital camera devices may utilize multiple software routines running within a multi-threading environment to perform the various steps of capturing, processing, compressing, and storing the image data.

Protecting the captured image data during the processing and compression stages (prior to final storage in non-volatile memory) is an important consideration of both camera manufacturers and camera users. Camera designers must therefore anticipate the occurrence of any events which might endanger the integrity of the captured image data.

A power failure in a digital camera device is one example of an event which might seriously jeopardize unprotected image data within the digital camera. For example, the digital camera may be performing a critical process at the time a power failure occurs. The intervening power failure may destroy the effect of the critical process and thus damage the image data or cause the digital camera to malfunction.

Further, a power failure may interrupt various camera functions which typically resume their respective tasks whenever power is restored to the digital camera. The interrupted functions, however, would be unaware that a power failure had intervened. The interrupted functions would thus be unaware of the hardware reset which results from reapplying power after the power failure. This confusion between the system software and hardware would potentially endanger camera operations.

For example, the digital camera may have been executing various processes which were waiting for hardware-generated interrupts at the time the power failure occurred. These interrupts, however, will never occur since the camera hardware has been reset due to the power failure and subsequent powerup sequence. For the foregoing reasons, an improved system and method is needed for recovering from a power failure within a digital camera device according to the present invention.

SUMMARY OF THE INVENTION

In accordance with the present invention, a system and method are disclosed for recovering from a power failure within a digital camera device. The preferred embodiment of the present invention includes central processing unit, a powerfail counter, a first-level interrupt handler, various interrupt service routines, a power manager and a voltage sensor.

In the preferred embodiment, the first-level interrupt handler initially sets the powerfail counter to a value of zero. Various interrupt service routines (each corresponding to a specific camera function or operation) may register themselves with the first-level interrupt handler (which coordinates all interrupts within the digital camera) to receive notification of an intervening power failure. Alternately, each interrupt service routine may receive a unique interrupt directly, via some form of vector interrupt mechanism or by using a hard-coding methodology.

The power manager monitors the voltage sensor to detect a power failure within the digital camera. After detecting a power failure in which the camera operating power is less than a specified threshold value, the power manager generates a powerfail interrupt. The central processing unit responsively performs a powerfail powerdown sequence to preserve image data contained within the digital camera at the time of the intervening power failure. The power manager removes operating power from all non-critical subsystems and switches the critical subsystems to a backup power supply. The central processing unit and the camera's volatile memory are thus maintained in a static low-power mode, with all states preserved intact.

After the power failure is remedied, the central processing unit performs a restart sequence to preserve any stored image data and to return the digital camera to a normal operational mode. In the preferred embodiment, the first-level interrupt handler increments the powerfail counter to record the intervening power failure. The first level interrupt handler then notifies the registered interrupt service routines about the power failure restart and corresponding hardware reset.

In alternate embodiments, the interrupt service routines may operate in cooperation with various other system routines. These cooperating routines thus may form various hierarchical networks which operate in synchronous or asynchronous modes. For example, a particular interrupt service routine may function in response to a device driver. The device driver, in turn, may function in response to an application program. In such cases, the interrupt service routines typically propagate their received power failure notification to any related routines in the network which require notification of the power failure restart.

In the normal operational mode, the digital camera periodically executes various critical processes which require successful completion. To ensure that a critical process is completed without an intervening power failure, the central processing unit preferably reads the powerfail counter prior to executing a critical process to obtain a pre-process value. After executing the critical process, the central processing unit again reads the powerfail counter to obtain a post-process value. The central processing unit then compares the pre-process value and the post-process value, and repeats the critical process if the pre-process value and the post-process value are different. The present invention thus preserves the integrity of captured image data and effectively assists the digital camera to recover from an intervening power failure.

DETAILED DESCRIPTION OF THE PREFERRED EMBODIMENT

The present invention discloses a system and method for recovering from a power failure within a digital camera device and comprises a power manager for detecting power failures, an interrupt handler for responsively incrementing a counter device, service routines which register to receive notification of the power failure, and a processor for evaluating the counter and providing notification of the power failure to the service routines which then may assist the digital camera to recover from the power failure.

Figure 1:
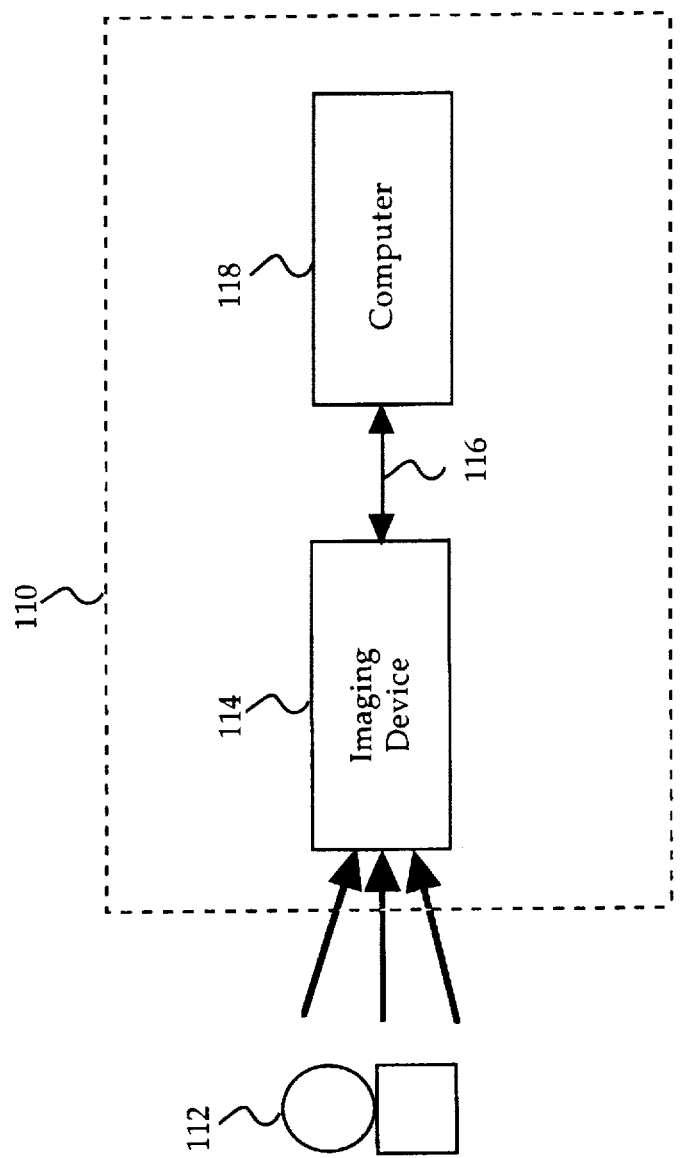
FIG. 1 is a block diagram of a digital camera according to the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
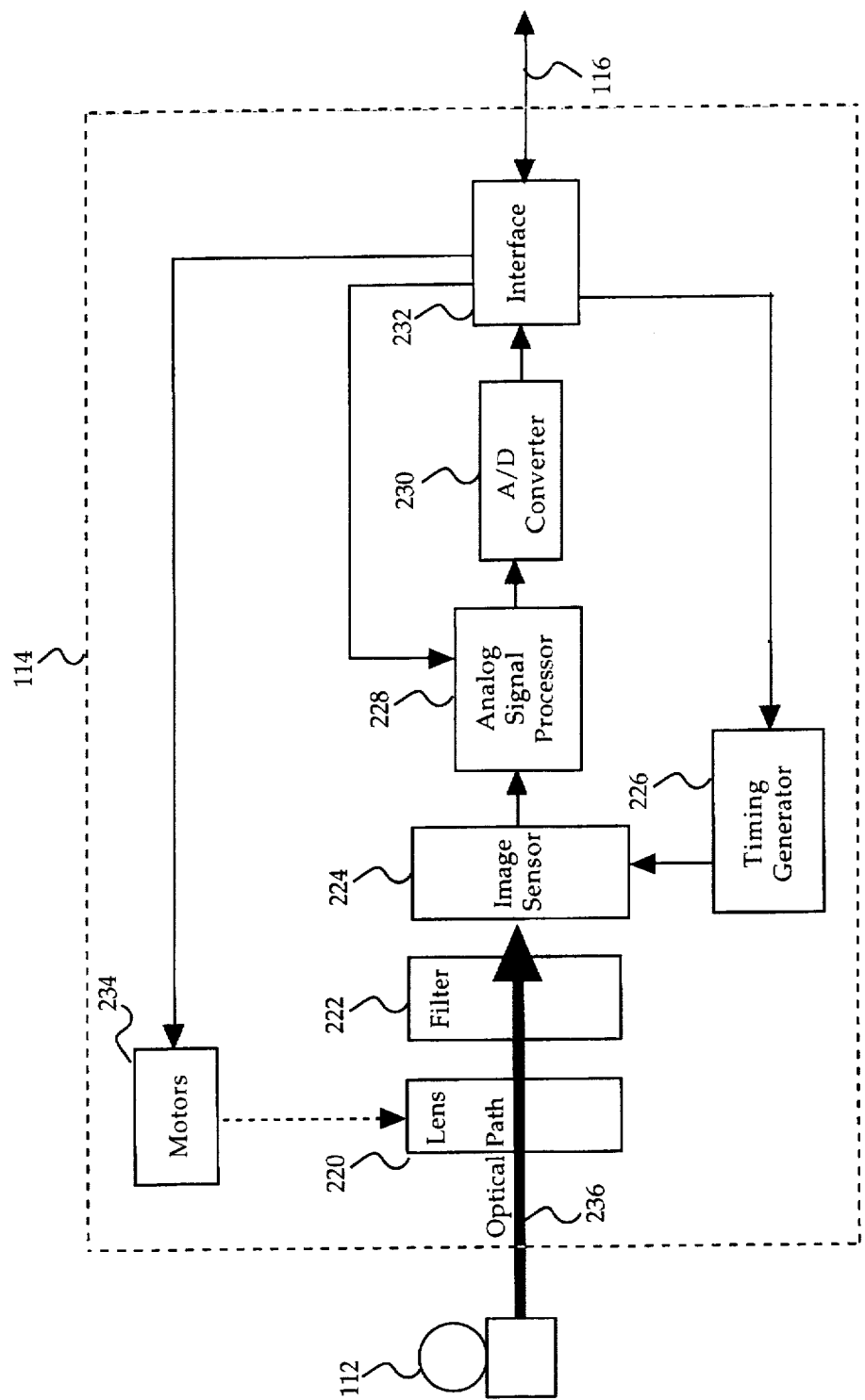
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. patent application Ser. No. 08/355,031, entitled "A System and Method For Generating a Contrast Overlay as a Focus Assist for an Imaging Device," filed on Dec. 13, 1994 is incorporated herein by reference and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
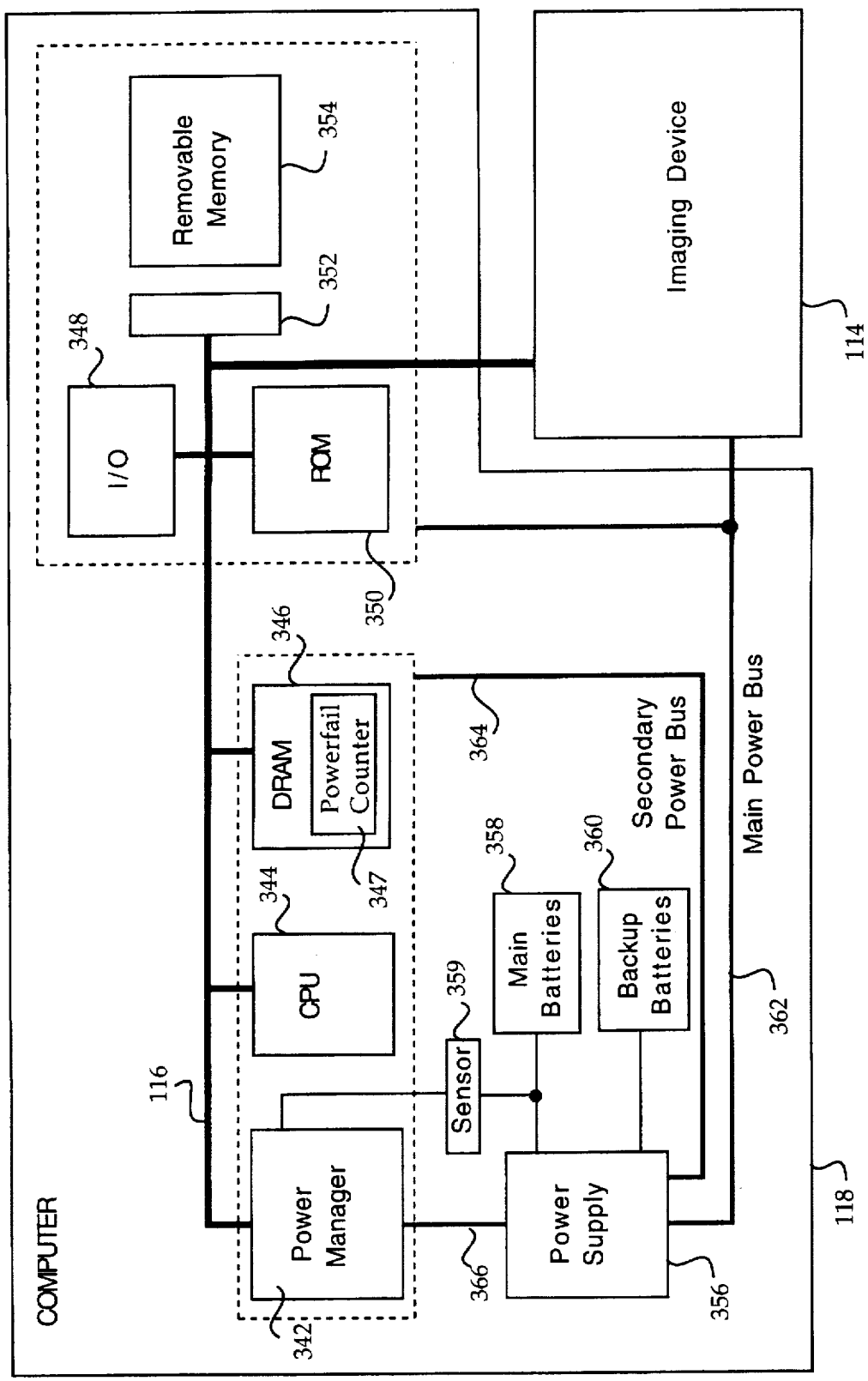
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and connector 352. In the preferred embodiment, removable memory 354 may also connect to system bus 116 via connector 352.

Power manager 342 communicates via line 366 with power supply 356 and coordinates power management operations for camera 110 as discussed below in conjunction with FIGS. 6–9. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions by computer 118. DRAM 346 includes a powerfail counter 347 which is incremented each time a power failure occurs in power supply 356. DRAM 346 and powerfail counter 347 are further discussed below in conjunction with FIGS. 5–9.

I/O 348 is an interface device allowing communications to and from computer 118. For example, I/O 348 permits an external host computer (not shown) to connect to and communicate with computer 118. I/O 348 also permits a camera 110 user to communicate with camera 110 via a set of externally-mounted user controls and via an external LCD display panel. ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in the main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Voltage sensor 359 detects the voltage supplied by main batteries 358 and responsively provides the detected voltage reading to power manager 342. The operation of power manager 342, power supply 356 and voltage sensor 359 are further discussed below in conjunction with FIGS. 6–8.

Figure 4:
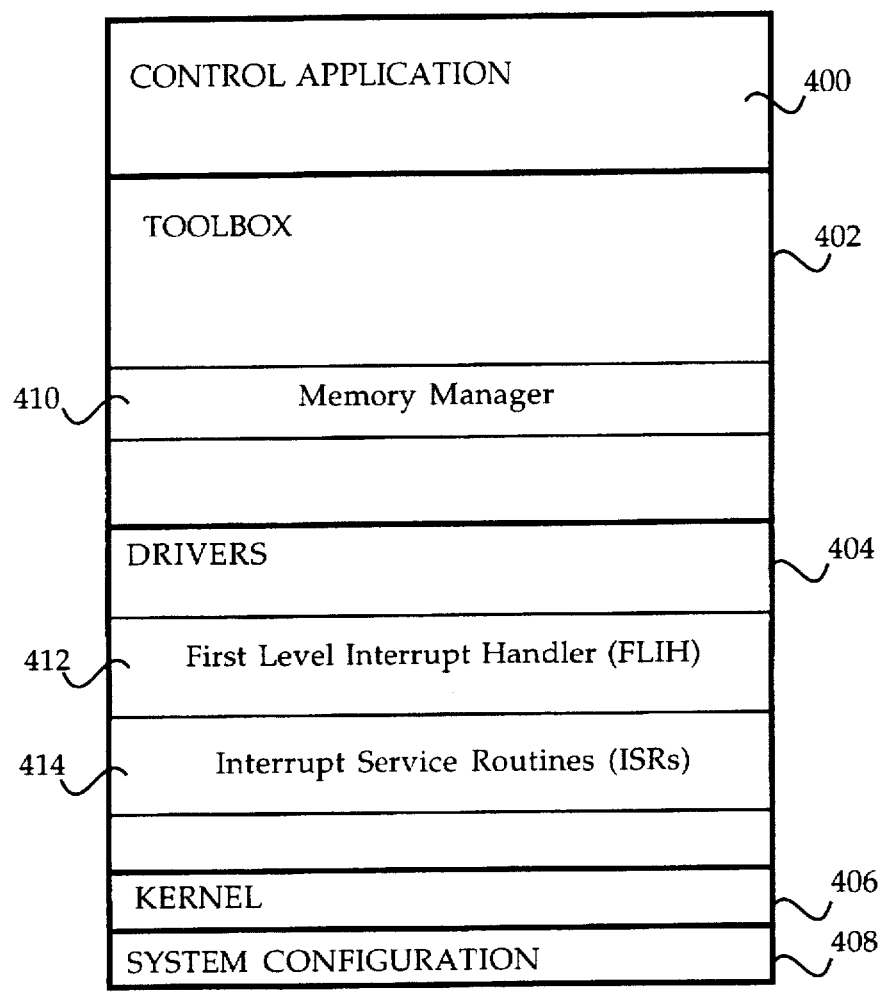
FIG. 4 is a memory map showing the preferred embodiment of the Read-Only Memory of FIG. 3.

Referring now to FIG. 4, a memory map showing the preferred embodiment of read-only memory (ROM) 350 is shown. In the preferred embodiment, ROM 350 includes control application 400, toolbox 402, drivers 404, kernel 406 and system configuration 408. Control application 400 comprises program instructions for controlling and coordinating the various functions of camera 110. Toolbox 402 contains selected function modules including memory manager 410 which is controlled by control application 400 and responsively allocates DRAM 346 storage locations depending upon the needs of computer 118 and the sets of received image data.

Drivers 404 control various components of camera 110 and include a first level interrupt handler (FLIH) 412 and various interrupt service routines (ISRs) 414. In the preferred embodiment, FLIH 412 is a software routine which coordinates all interrupts within camera 110. FLIH 412 typically handles ordinary non-critical interrupts and also handles non-maskable critical interrupts such as a power failure in main batteries 358. FLIH 412 preferably communicates with the various ISRs 414 which are each designed to handle a specific corresponding interrupt within camera 110. FLIH 412 notifies the appropriate ISRs 414 via a "signal" when the interrupts occur. A signal is a mechanism used by multi-tasking operating systems for inter-process communications and synchronization.

For example, a camera 110 user may request zoom motor 234 to perform a zoom operation using lens 220. When the requested zoom process is complete, an interrupt is generated to indicate that zoom motor 234 and lens 220 have reached their destination positions. The particular ISR 414 which corresponds to the foregoing zoom process then responsively handles the generated interrupt and provides a status update to higher-level routines, if necessary. In preferred embodiment, kernel 406 provides a range of basic underlying services for the camera 110 operating system. System configuration 408 performs initial start-up routines for camera 110, including the boot routine and initial system diagnostics.

Figure 5:
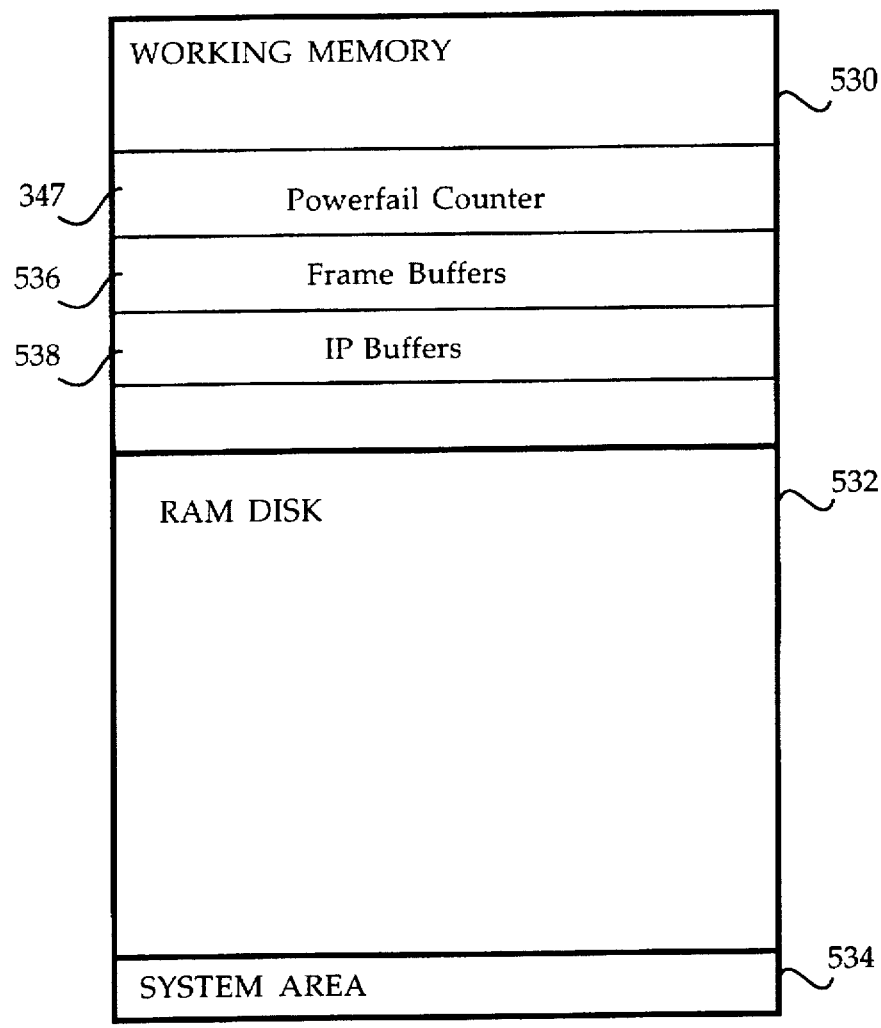
FIG. 5 is a memory map showing the preferred embodiment of the Dynamic Random-Access Memory of FIG. 3.

Referring now to FIG. 5, a memory map showing the preferred embodiment of dynamic random-access memory (DRAM) 346 is shown. In the preferred embodiment, DRAM 346 includes working memory 530, RAM disk 532 and system area 534. Working memory 530 includes a powerfail counter 347, frame buffers 536 (for initially storing sets of raw image data received from imaging device 114) and image processing (IP) buffers 538 (for temporarily storing image data during the image processing and compression 420 process). In the preferred embodiment, power fail counter 347 stores a value which first-level interrupt handler 412 preferably increments each time voltage sensor 359 detects a power failure in main batteries 358. Powerfail counter 347 is further discussed below in conjunction with FIGS. 6–9. Working memory 530 may also contain various stacks, data structures and variables used by CPU 344 while executing the software routines used within computer 118.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 6:
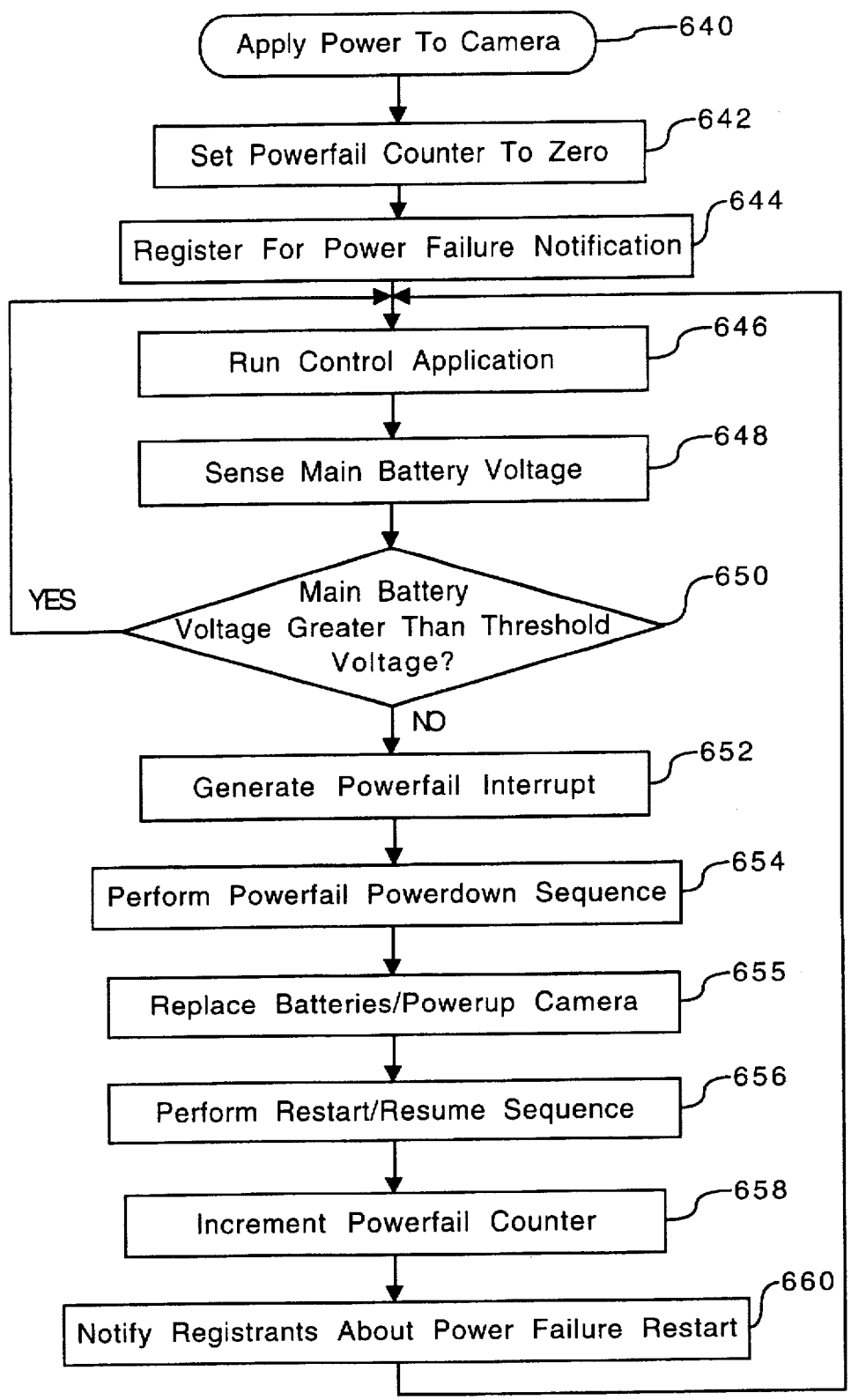
FIG. 6 is a flowchart of preferred general method steps for recovering from a power failure according to the present invention.

Referring now to FIG. 6, a flowchart of preferred general method steps for recovering from a power failure is shown. Initially, a user applies 640 power to camera 110 by installing main batteries 358 and backup batteries 360, and then activating an externally-mounted power on-off switch. First-level interrupt handler (FLIH) 412 then sets 642 powerfail counter 347 to a value of zero. Next, various interrupt service routines 414 register 644 with the first level interrupt handler 412 to request notification in the event of a power failure in main batteries 358.

CPU 344 then runs 646 control application 400 to operate camera 110 in normal operation mode which captures, processes, compresses and stores sequential sets of image data. In normal operation mode, CPU 344 periodically requests the execution of various critical processes. In the preferred embodiment, CPU 344 repeatedly checks powerfail counter 347 to determine whether a critical process has been interrupted by an intervening power failure. This process of using powerfail counter 347 to ensure the successful execution of critical processes is further discussed below in conjunction with FIG. 9.

Next, voltage sensor 359 senses 648 the voltage level of main batteries 358 and provides power manager 342 with the sensed voltage level. Power manager 342 then determines 650 whether the voltage level of main batteries 358 is greater than a predetermined threshold voltage level. The threshold value is typically selected to be incrementally higher that the minimum operating voltage (to permit orderly shutdown of the camera 110 processes). If the voltage of main batteries 358 is greater than the selected threshold value, then the FIG. 6 process repeats the steps 646, 648 and 650.

However, if the voltage of main batteries 358 is not greater 650 than the predetermined threshold value, then power manager 342 generates 652 a powerfail interrupt. In the preferred embodiment, the powerfail interrupt may be disabled in rare cases in which a sequence of CPU 344 instructions must never be interrupted by a power failure. Any disabling of the powerfail interrupt, however, is restricted to a very short period of time. Next, CPU 344 receives the generated powerfail interrupt and responsively performs 654 a powerfail powerdown sequence to protect the image data currently within camera 110. The powerfail powerdown sequence is further discussed below in conjunction with FIG. 7.

The camera 110 user may then replace 655 the main batteries 358 and activate the camera 110 power on/off switch. CPU 344 then performs 656 a restart/resume sequence to bring camera 110 back to normal operating mode while also preserving any existing image data. FLIH 412 then increments 658 powerfail counter 347 to indicate the occurrence of a power failure in main batteries 358. Alternately, powerfail counter 347 may be a hardware register which is incremented in power manager 342.

The first level interrupt handler 412 then notifies 660 any registered interrupt service routines 414 about the power failure restart so that the interrupt service routines 414 are aware that their corresponding hardware components have been reset by the power failure and the subsequent camera 110 powerup. The power failure notification allows the registered interrupt service routines 414 to run depending upon their relative task priority. Typically, this notification is accomplished through the use of a signal or semaphore which wakes up the interrupt service routine.

In alternate embodiments, the interrupt service routines may operate in cooperation with various other system routines. These cooperating routines thus may form various hierarchical networks which operate in synchronous or asynchronous modes. For example, a particular interrupt service routine may function in response to a device driver. The device driver, in turn, may function in response to an application program. In such cases, the interrupt service routines typically propagate their received power failure notification to any related routines in the network which require notification of the power failure restart. Finally, the FIG. 6 process then returns to step 646 and CPU 344 runs control application 400 to operate camera 110 in normal operation mode, as discussed above.

Figure 7:
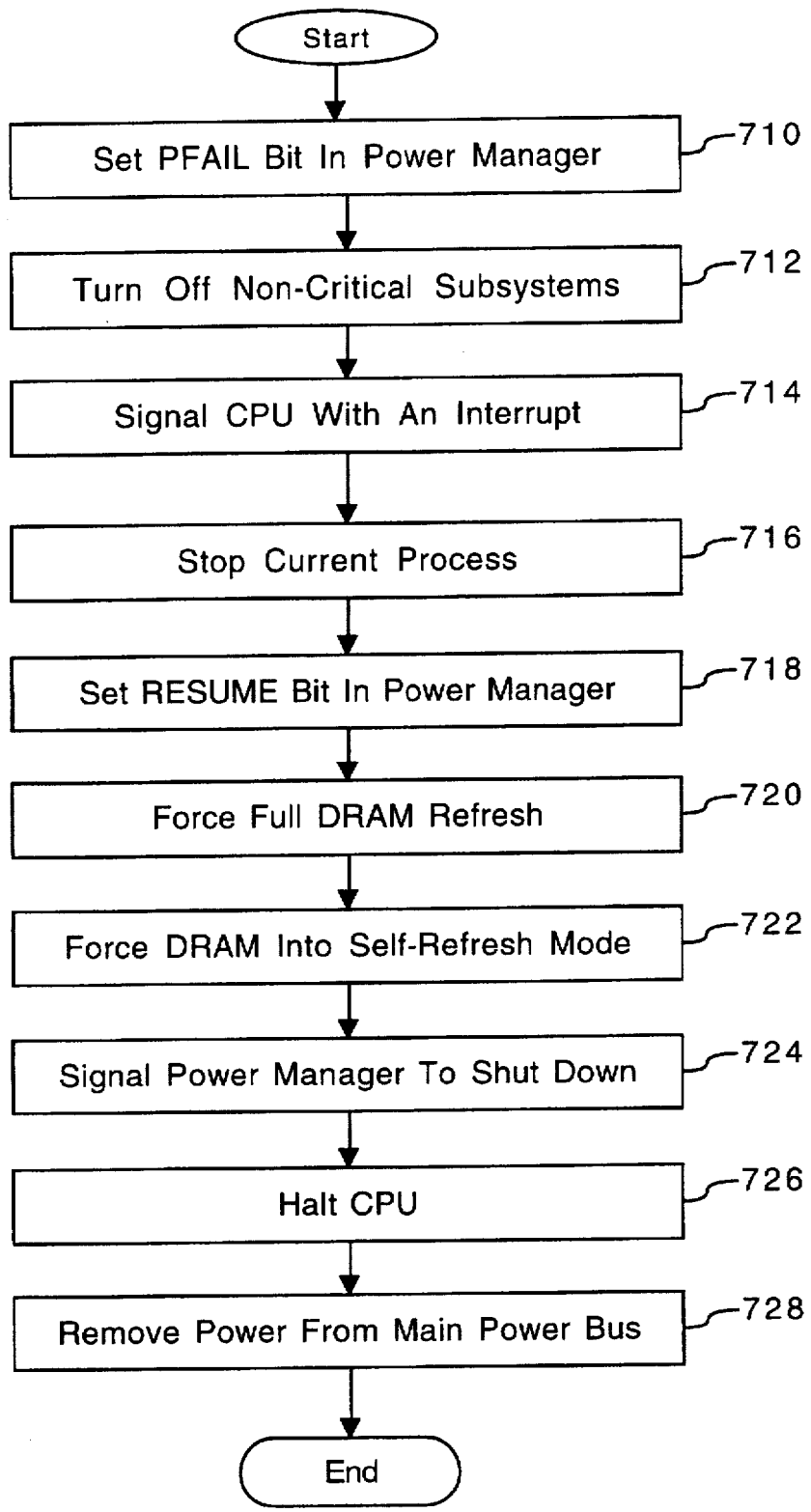
FIG. 7 is a flowchart of preferred method steps for performing a powerfail powerdown sequence according to the present invention.

Referring now to FIG. 7, a flowchart of preferred method steps for performing a powerfail powerdown sequence according to the present invention is shown. Initially, power manager 342 sets 710 a PFAIL bit which records the occurrence of a power failure so that computer 118 software routines may subsequently access this information when needed. Next, power manager 342 turns off 712 all non-critical subsystems. Power manager 342 then signals 714 CPU 344 with an interrupt and CPU 344 responsively stops 716 the current process.

Next, CPU 344 sets 718 the RESUME bit in power manager 342 to indicate that CPU 344 should not be reset in a subsequent powerup of camera 110. CPU 344 then forces 720 a full refresh of DRAM 346 and then forces 722 DRAM 346 into a self-refresh mode. Next, CPU 344 signals 724 power manager 342 to shut down and then CPU 344 halts 726 operation. After halting, CPU 344 still receives operating power from backup batteries 360 and is essentially stopped "in place." In this static mode, system bus 116 is in a tri-state condition and the CPU 344 clock is stopped. All CPU 344 states, however, are still intact (for example, the registers, program counter, cache and stack are preserved intact) and image data in DRAM 346 is also preserved intact. Next, power manager 342 removes 728 operating power from main power bus 362. The FIG. 7 powerfail powerdown sequence is then complete.

Figure 8:
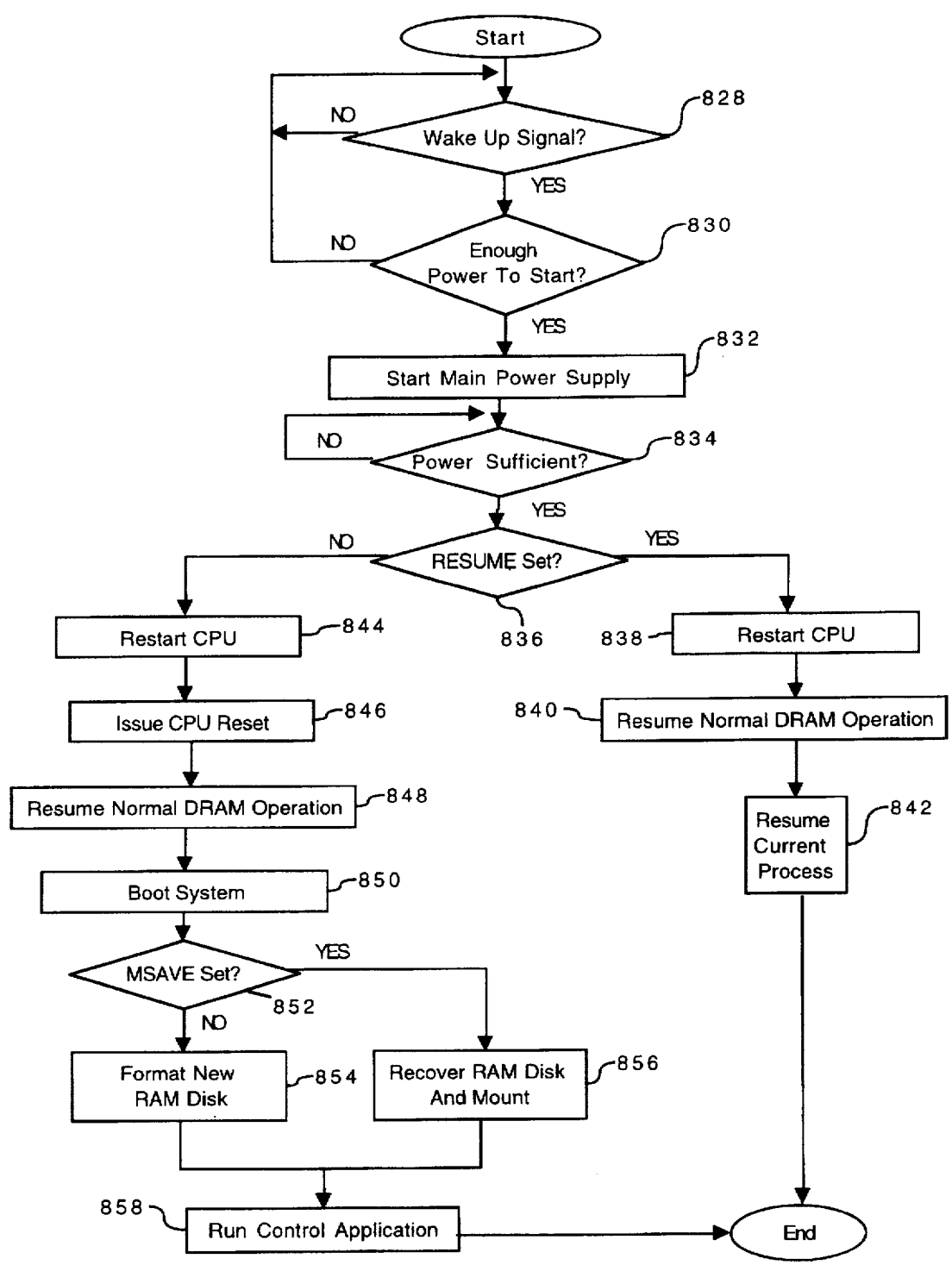
FIG. 8 is a flowchart of preferred method steps for performing a resume/restart sequence according to the present invention.

Referring now to FIG. 8, a flowchart of preferred method steps for performing a restart/resume sequence according to the present invention is shown. Initially, CPU 344 waits 828 for a "wake up" signal which is typically generated in response to the activation of a camera 110 power on-off switch. After the "wake up" signal is generated, power manager 342 determines 830 whether power supply 356 is generating enough operating power to start camera 110. If sufficient operating power is present, power manager 342 starts 832 power supply 356 in normal mode with the main batteries 358 providing operating power to power supply 356 which then responsively provides the operating power to main power bus 362 and also to secondary power bus 364. Next, power manager 342 determines 834 whether the generated operating power is maintaining a sufficient voltage level.

If operating power is sufficient in camera 110, power manager 342 then determines 836 whether a RESUME bit has been set. In the preferred embodiment, CPU 344 sets the RESUME bit in response to a power failure in order to indicate that CPU 344 should not be reset in a subsequent powerup of camera 110. If the RESUME bit has been set, power manager 342 restarts 838 the CPU 344, resumes 840 normal operation of DRAM 346 and then resumes 842 the camera 110 process which was interrupted by the intervening power failure.

If the RESUME bit has not been set, then power manager 342 restarts 844 the CPU 344 and issues 846 a CPU 344 reset. CPU 344 then resumes 848 normal operation of DRAM 346 and boots 850 the computer 110 system using the system configuration 408 routine. Next, CPU 344 determines 852 whether a MSAVE bit has been set in power manager 342. In the preferred embodiment, CPU 344 sets the MSAVE bit to specify that RAM disk 532 contains image data that should be saved upon restart of computer 118. If the MSAVE bit has not been set, computer 118 formats 854 a new RAM disk 532. CPU 344 then runs 858 control application 400 for normal operation of camera 110. In step 852, if the MSAVE bit has been set, then CPU 344 recovers and mounts 856 RAM disk 532. CPU 344 then runs 858 control application 400 for normal operation of camera 110. The restart/resume process of FIG. 8 then ends.

Figure 9:
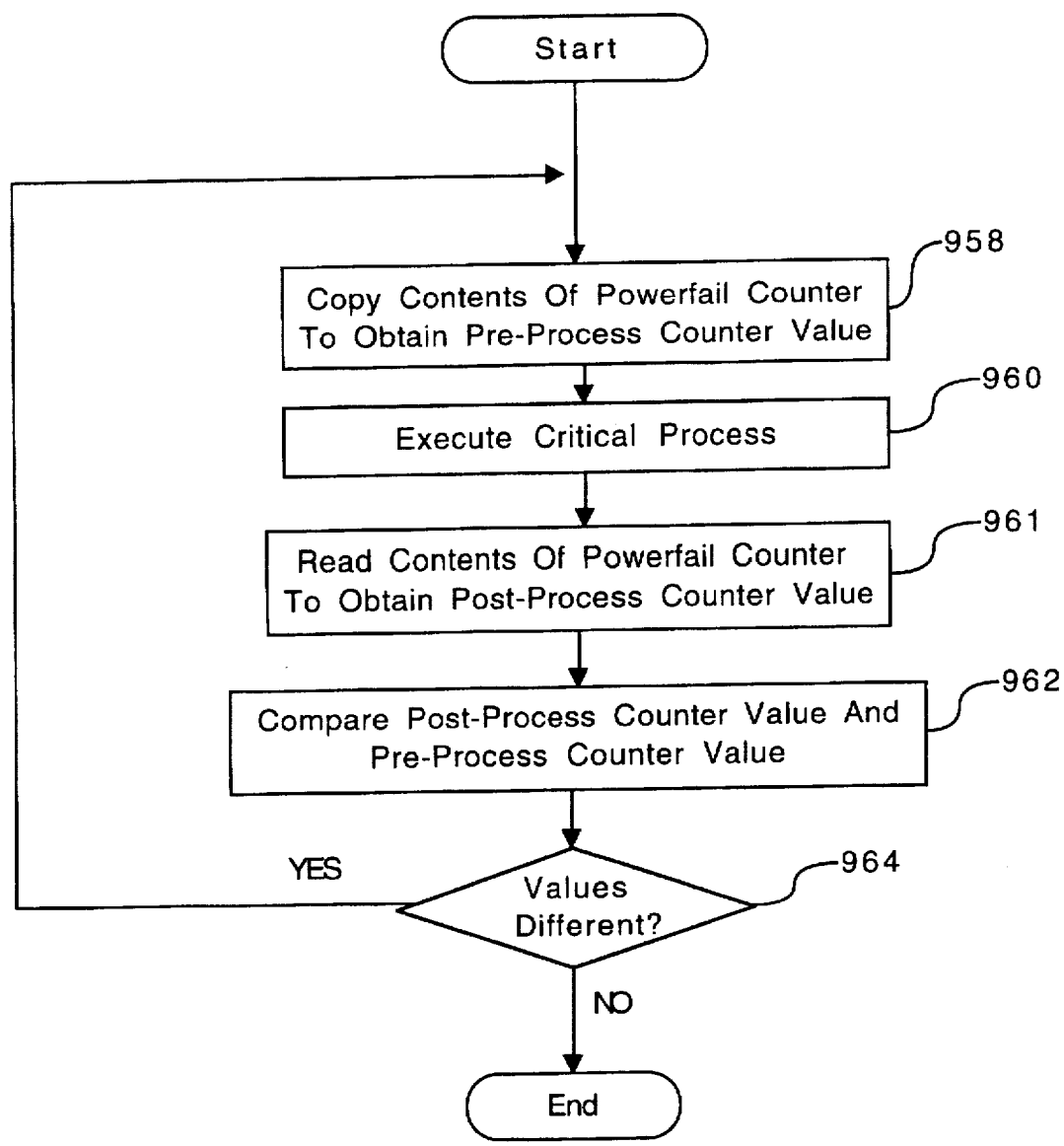
FIG. 9 is a flowchart of preferred method steps for a critical process to detect an intervening power failure according to the present invention.

Referring now to FIG. 9, a flowchart of preferred method steps for allowing a critical process to detect an intervening power failure is shown. This critical process may include any specified camera 110 process or operation whose successful completion would be seriously impaired by an intervening power failure within camera 110.

Initially, CPU 344 copies 958 the contents of powerfail counter 347 to obtain a pre-process counter 347 value. Next, CPU 344 executes 960 the selected critical process. After CPU 344 has executed the selected critical process, then CPU 344 reads 961 the current value in powerfail counter 347 to obtain a post-process counter 347 value. CPU 344 then compares 962 the post-process counter 347 value to the previously-copied pre-process counter 347 value. Finally, CPU 344 determines 964 whether the previously-copied pre-process counter 347 value and the current post-process counter 347 value are different.

If the previously-copied pre-process counter 347 value and the current post-process counter 347 value are not different, then the selected critical process was not interrupted by an intervening power failure and CPU 344 has successfully executed the selected critical process. The FIG. 9 process therefore ends. If, however, the previously-copied pre-process counter 347 value and the current post-process counter 347 value are different (step 964), then the FIG. 9 process loops back to step 958 and repeats until CPU 344 successfully executes the selected critical process without an intervening power failure.

The invention has been explained above with reference to a preferred embodiment. Other embodiments will be apparent to those skilled in the art in light of this disclosure. For example, the powerfail counter 347 of the present invention may used to record occurrences within computer 118 other than the power failure discussed above in the preferred embodiment. Therefore, these and other variations upon the preferred embodiment are intended to be covered by the present invention, which is limited only by the appended claims.

What is claimed is:

1. A system for recovering from a failure to a power supply in a computer device, comprising:
   a power manager for detecting said failure and responsively generating a powerfail interrupt;
   service routines for registering to receive a notification of said failure to said power supply; and
   an interrupt handler for providing said notification to said service routines and incrementing a counter device in response to said powerfail interrupt;
   whereby said service routines may assist said computer device to recover from said failure to said power supply.

2. The system of claim 1 further comprising a processor which:
   evaluates said counter device prior to executing a critical process to obtain a pre-process value;
   evaluates said counter device subsequent to executing said critical process to obtain a post-process value;
   compares said pre-process value and said post-process value; and
   repeats said critical process if said pre-process value and said post-process value are different.

3. The system of claim 1 wherein said processor performs a powerdown sequence and a subsequent restart sequence after detecting said failure, whereby data within said computer device is protected.

4. The system of claim 1 further comprising a voltage sensor device for monitoring said power supply and providing said power manager with a power supply voltage value.

5. A method for recovering from a failure to a power supply in a computer device, comprising the steps of:
   registering service routines to receive a notification of said failure to said power supply;
   detecting said failure to said power supply;
   generating a powerfail interrupt in response to said failure; and
   providing said notification to said service routines and incrementing a counter device in response to said powerfail interrupt;
   whereby said service routines may assist said computer device to recover from said failure to said power supply.

6. The method of claim 5 wherein a processor performs the steps of:
   evaluating said counter device prior to executing a critical process to obtain a pre-process value;
   evaluating said counter device subsequent to executing said critical process to obtain a post-process value;
   comparing said pre-process value and said post-process value; and
   repeating said critical process if said pre-process value and said post-process value are different.

7. The method of claim 5 further comprising the steps of performing a powerdown sequence and a subsequent restart sequence, after detecting said failure, whereby data within said computer device is protected.

8. The method of claim 5 further comprising the step of monitoring said power supply and responsively providing a power supply voltage value using a voltage sensor.

9. A computer-readable medium comprising program instructions for recovering from a failure to a power supply in a computer device by performing the steps of:
   registering service routines to receive a notification of said failure to said power supply;
   detecting said failure to said power supply;
   generating a powerfail interrupt in response to said failure; and
   providing said notification to said service routines and incrementing a counter device in response to said powerfail interrupt;
   whereby said service routines may assist said computer device to recover from said failure to said power supply.

10. The computer-readable medium of claim 9 wherein a processor performs the steps of:
    evaluating said counter device prior to executing a critical process to obtain a pre-process value;
    evaluating said counter device subsequent to executing said critical process to obtain a post-process value;
    comparing said pre-process value and said post-process value; and
    repeating said critical process if said pre-process value and said post-process value are different.

11. The computer-readable medium of claim 9 further comprising the steps of performing a powerdown sequence and a subsequent restart sequence after detecting said failure, whereby data within said computer device is protected.

12. The computer-readable medium of claim 9 further comprising the steps of monitoring said power supply and responsively providing a power supply voltage value using a voltage sensor.

13. A system for recovering from a failure to a power supply in a computer device, comprising:
    means for registering service routines to receive a notification of said failure to said power supply;
    means for detecting said failure to said power supply;
    means for generating a powerfail interrupt in response to said failure; and
    means for providing said notification to said service routines and for incrementing a counter device in response to said powerfail interrupt;
    whereby said service routines may assist said computer device to recover from said failure to said power supply.

14. The system of claim 13 wherein a processor performs the steps of:
    evaluating said counter device prior to executing a critical process to obtain a pre-process value;
    evaluating said counter device subsequent to executing said critical process to obtain a post-process value;
    comparing said pre-process value and said post-process value; and
    repeating said critical process if said pre-process value and said post-process value are different.

15. The system of claim 13 wherein said process performs a powerdown sequence and a subsequent restart sequence after said failure is detected, whereby data within said computer device is protected.

16. The system of claim 13 further comprising a voltage sensing means for monitoring said power supply and providing said means for detecting with a power supply voltage value.

17. In a digital camera having a power supply for supplying power to various components of the digital camera, a system for detecting and recovering from a failure of the power supply, the system comprising:
    means for detecting the failure of the power supply and responsively generating a notification thereof; and a plurality of interrupt service routines, each of the plurality of interrupt service routines being associated with a corresponding software routine controlling a specific function or operation of the digital camera, for receiving the notification of the failure to the power supply and for communicating the failure to the corresponding software routine;

whereby the notification of the power supply failure provided to the plurality of service routines assists the digital camera to recover from the power supply failure and to prevent the loss of stored image data.

18. In a digital camera having a power supply for supplying power to various components of the digital camera, a method for recovering from a failure of the power supply, the method comprising the steps of:

providing a plurality of service routines for receiving a notification of the power supply failure, each of the plurality of service routines being associated with a specific operation or function of the digital camera;

detecting the failure of the power supply and responsively generating a power failure interrupt; and notifying the plurality of service routines in response to the generated power failure interrupt;

whereby the notification of the power supply failure provided to the plurality of service routines assists the digital camera to recover from the power supply failure and to prevent the loss of stored image data.

* * * * *